United States Patent [19]

Sanchez

[11] Patent Number: 5,277,218
[45] Date of Patent: Jan. 11, 1994

[54] SHOWER WATER RECYCLING APPARATUS

[76] Inventor: Ronald A. Sanchez, 1472 Sandy Creek Dr., Newman, Calif. 95360

[21] Appl. No.: 36,355

[22] Filed: Mar. 24, 1993

[51] Int. Cl.⁵ .......................... E03C 1/02; E03D 1/32
[52] U.S. Cl. ........................... 137/268; 4/597; 4/665; 137/423; 137/875
[58] Field of Search ................... 4/546, 559, 597, 605, 4/665; 137/268, 423, 875

[56] References Cited
U.S. PATENT DOCUMENTS
5,165,456 11/1992 Woolman ..................... 4/597 X Primary Examiner—Gerald A. Michalsky
Attorney, Agent, or Firm—Leon Gilden

[57] ABSTRACT

A delivery conduit operative through a valve member directs fluid selectively from the shower conduit to a storage tank in operative communication with a commode, wherein the storage tank permits selective use of water from a primary conduit or from the delivery conduit for the utilization of water therefrom.

3 Claims, 4 Drawing Sheets

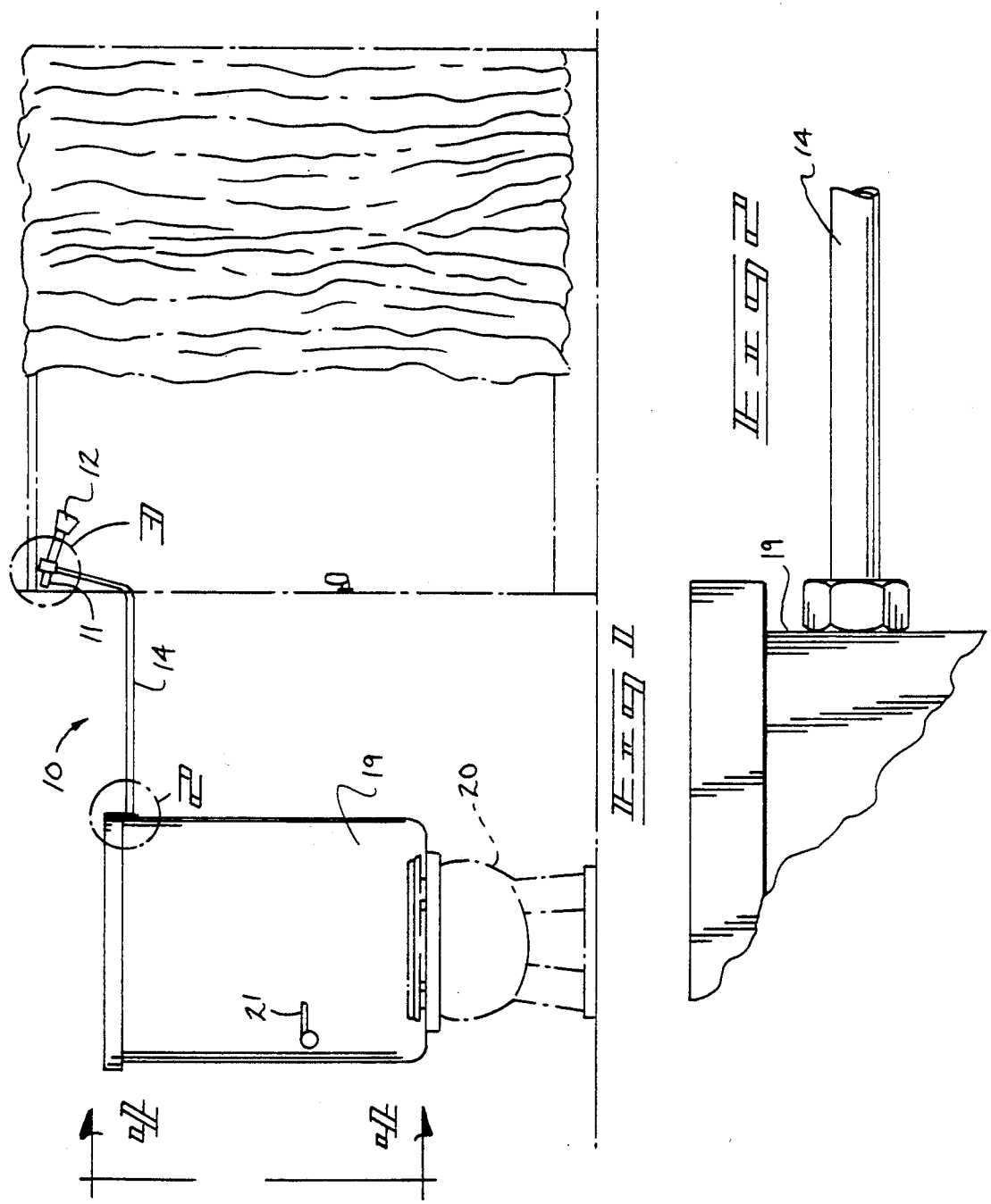

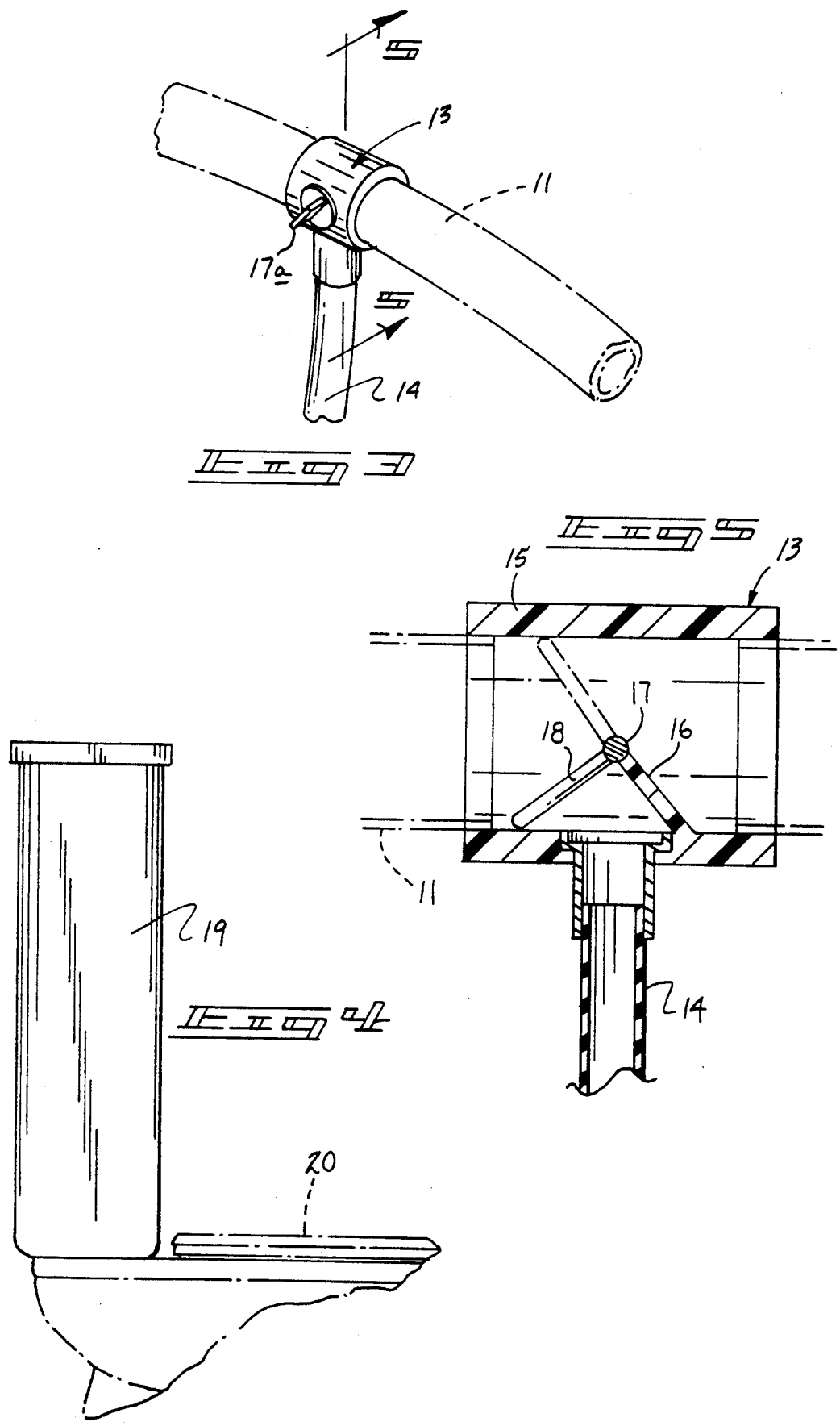

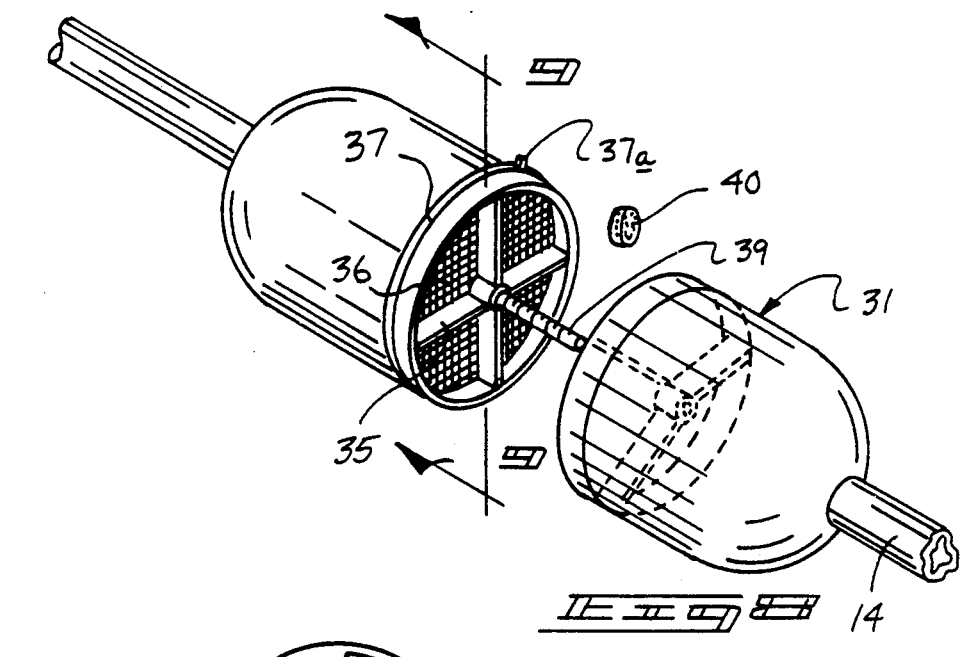
FIG 8
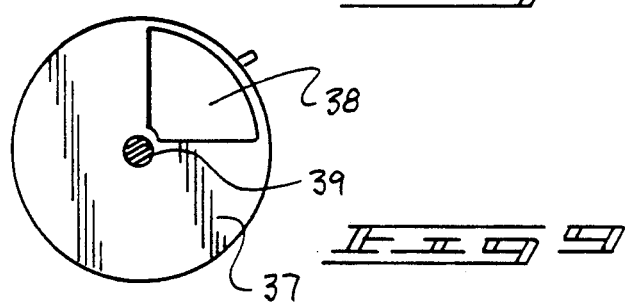
FIG 9
FIG 10
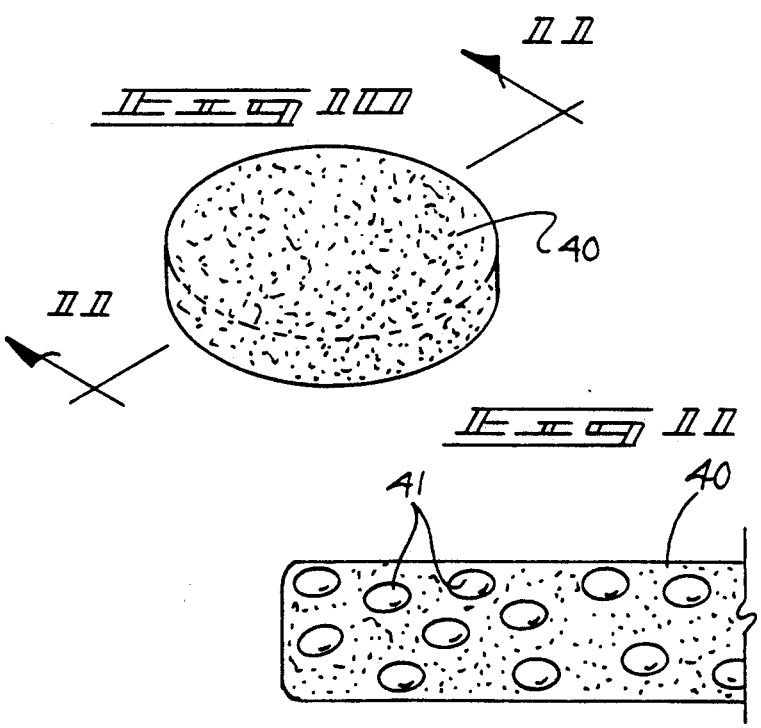
FIG 11

SHOWER WATER RECYCLING APPARATUS

BACKGROUND OF THE INVENTION

1. Field of the Invention

The field of invention relates to water recycling apparatus, and more particularly pertains to a new and improved shower water recycling apparatus wherein the same permits the directing of unused shower water to a storage reservoir for a commode.

2. Description of the Prior Art

Typically, in the use of shower apparatus an individual directs the water from a shower in a wasteful manner prior to the shower water being heated to a desirable temperature. In this regard, that initial water in the instant invention is directed to a storage reservoir for use by a commode facility in a manner not addressed by the prior art and in this respect, the present invention substantially fulfills this need.

SUMMARY OF THE INVENTION

In view of the foregoing disadvantages inherent in the known types of water recycling apparatus now present in the prior art, the present invention provides a shower water recycling apparatus wherein the same directs unused shower water from a shower conduit to a storage reservoir for a commode. As such, the general purpose of the present invention, which will be described subsequently in greater detail, is to provide a new and improved shower water recycling apparatus which has all the advantages of the prior art water recycling apparatus and none of the disadvantages.

To attain this, the present invention provides a delivery conduit operative through a valve member directing fluid selectively from the shower conduit to a storage tank in operative communication with a commode, wherein the storage tank permits selective use of water from a primary conduit or from the delivery conduit for the utilization of water therefrom.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shower water recycling apparatus which has all the advantages of the prior art water recycling apparatus and none of the disadvantages.

It is another object of the present invention to provide a new and improved shower water recycling apparatus which may be easily and efficiently manufactured and marketed.

It is a further object of the present invention to provide a new and improved shower water recycling apparatus which is of a durable and reliable construction.

An even further object of the present invention is to provide a new and improved shower water recycling apparatus which is susceptible of a low cost of manufacture with regard to both materials and labor, and which accordingly is then susceptible of low prices of sale to the consuming public, thereby making such shower water recycling apparatus economically available to the buying public.

Still yet another object of the present invention is to provide a new and improved shower water recycling apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the invention.

FIG. 2 is an enlarged orthographic view of section 2 as set forth in FIG. 1.

FIG. 3 is an enlarged isometric illustration of section 3 as set forth in FIG. 1.

FIG. 4 is an orthographic view, taken along the lines 4—4 of FIG. 1 in the direction indicated by the arrows.

FIG. 5 is an orthographic view, taken along the lines 5—5 of FIG. 3 in the direction indicated by the arrows.

FIG. 8 is an isometric illustration of the positioning of the additive dispenser housing employed by the invention.

FIG. 9 is an orthographic view, taken along the lines 9—9 of FIG. 8 in the direction indicated by the arrows.

FIG. 10 is an isometric illustration of the additive tablet employed by the invention.

FIG. 11 is an orthographic view, taken along the lines 11—11 of FIG. 10 in the direction indicated by the arrows.

DESCRIPTION OF THE PREFERRED EMBODIMENT

Figure 6:
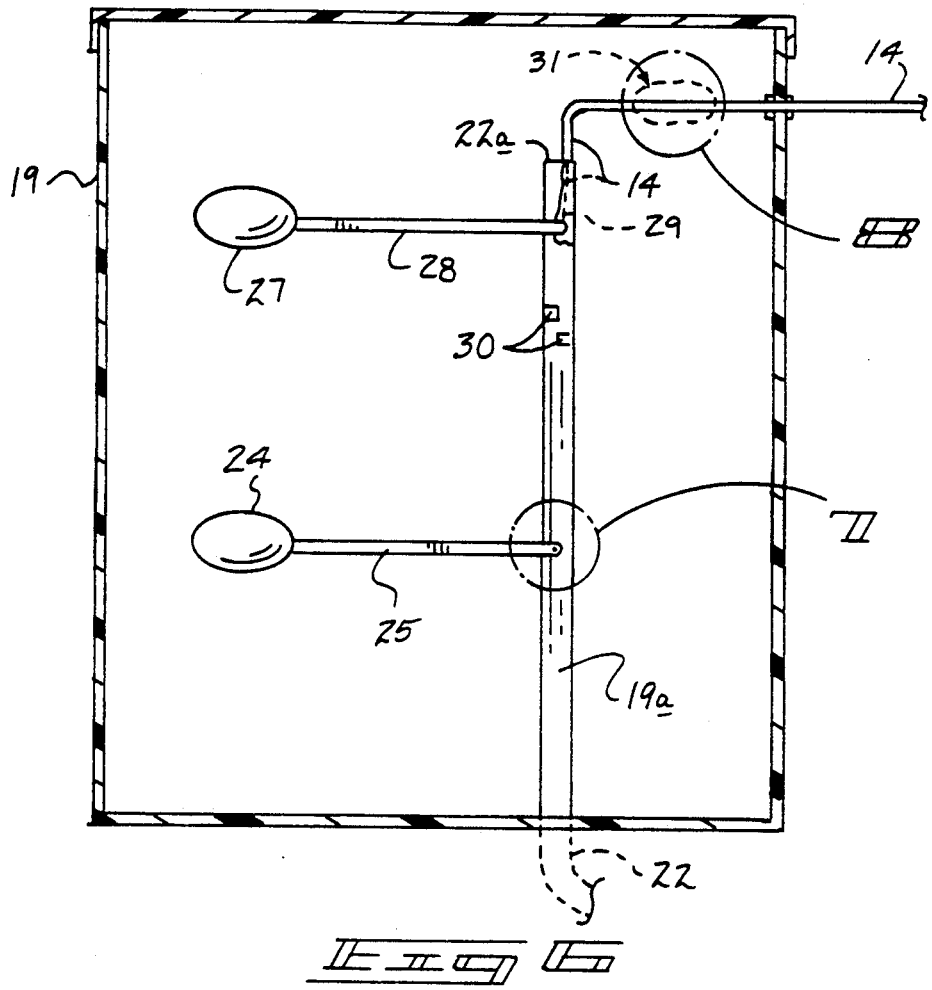
FIG. 6 is a cross-sectional illustration of the storage reservoir of the invention.
Figure 7:
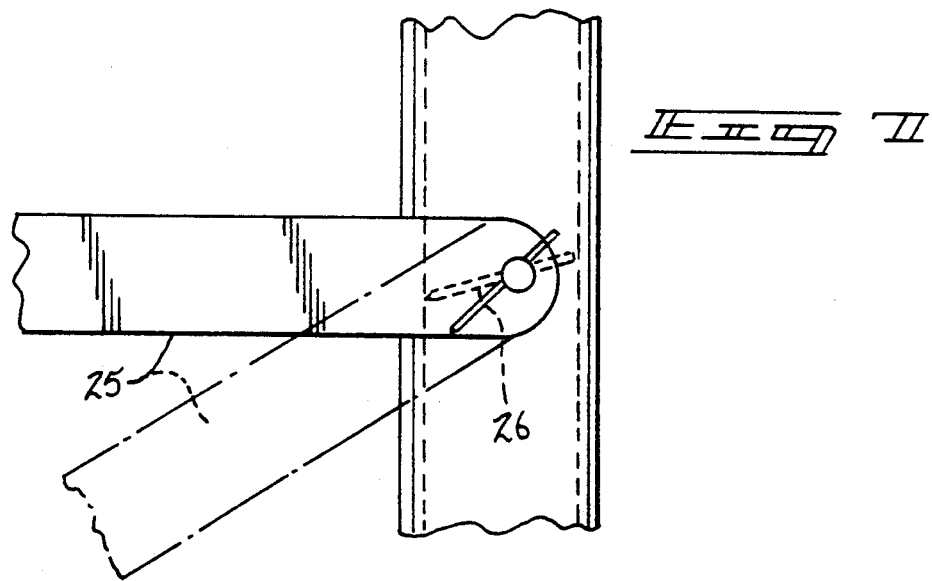
FIG. 7 is an orthographic view of section 7 as set forth in FIG. 6.

With reference now to the drawings, and in particular to FIGS. 1 to 11 thereof, a new and improved shower water recycling apparatus embodying the principles and concepts of the present invention and generally designated by the reference numeral 10 will be described.

More specifically, the shower water recycling apparatus 10 of the instant invention essentially comprises a shower conduit 11 directed into a shower head 12 through a shower conduit valve 13 (see FIG. 3 for example). The shower conduit valve directs selective flow from the shower conduit 11 into a delivery conduit 14 that extends from the shower conduit valve 13 to a storage tank 19, whereupon the delivery conduit 14 is directed into the tank and received within a free distal end of a pipe 19a (see FIG. 6). A valve body 15 of the shower conduit valve 13 includes a fixed baffle plate 16 canted over the entrance to the delivery conduit 14, wherein the baffle plate 16 includes a baffle plate axle 17 rotatably mounted over the baffle plate and directed through the valve body 15 terminating in an axle handle 17a exteriorly of the shower conduit valve 13, whereupon a closure plate 18 mounted to the valve plate axle 17 effects selective closure of the shower conduit valve 13 directing fluid flow from the shower head 12 for a predetermined period of time into the delivery conduit 14 to direct fluid therefrom into the stand pipe 19a within the storage tank 19.

The storage tank 19 is used in fluid communication with a commode 20 utilizing a flush handle 21 to direct water from the storage tank 19 into the commode 20 in a conventional manner to effect flushing of the commode 20.

A primary fluid conduit 22 is directed into the storage tank 19 into communication with the stand pipe 19a. The entrance opening 20a of the stand pipe spaced from the primary fluid conduit 22 is illustrated to receive the delivery conduit 14, wherein the primary fluid conduit 22 is directed into the fluid supply of a dwelling and the like as is the shower conduit 11.

A first float 24 is provided, having a first float arm 25 pivotally mounted to the stand pipe 19a, with a valve plate 26 mounted within the stand pipe in operative association with the first float arm 25, whereupon raising of the first float arm 25 effects closing of the first float valve plate 26. Typically, water directed through the first float valve plate 26 is directed into the fluid reservoir through window openings 30. A second float 27 is provided oriented between the first float and the entrance opening 22a of the stand pipe 19a, wherein the second float includes a second float arm 28 pivotally mounted to the stand pipe 19a between the entrance opening 22a and the primary float conduit 22, with a second float arm valve 29 effecting closure of the delivery conduit 14. Upon fluid within the reservoir 19 dropping below a predetermined level to permit fluid to be directed from the delivery conduit 14, this directs such fluid through the windows 30. Should fluid drop further below the first float 24, water from the primary fluid conduit 22 is directed through the window openings 30 for filling of the storage tank 19.

Optionally, an additive dispenser housing 31 (see FIGS. 6 and 8) is added within the storage tank 19 onto and in fluid communication with the delivery conduit 14. The additive dispenser housing 31 includes a first chamber 32 selectively securable to a second chamber 33 utilizing conventional fasteners or threaded interengagement of the first and second chambers. A screen grid 34 is mounted within the second chamber at an intersection with the first chamber, having intersecting partition walls 35 to define quadrants 36, wherein one of the quadrants is arranged to receive a water soluble tablet 40 of water soluble bactericide, having dye capsules 41 therewithin. The dye capsules are arranged to indicate the coloration of the fluid directed into the storage tank 19 to indicate proper functioning of the valve structures to include the shower conduit valve 13 and the second float arm valve 29. A rotary plate 37 is mounted within the second chamber 33 adjacent the screen grid 34, wherein the rotary plate includes a rotary plate handle 37 positioned exteriorly of the rotary plate adjacent a rotary plate opening 38 arranged to overlie one of the quadrants 36 in use to provide for the directing of fluid through the second chamber 33, in a manner to effect rapid or slower utilization of the tablet 40. A housing axle 39 rotatably mounts the rotary plate 37 within the second chamber, as well as the alignment of the first chamber relative to the second chamber.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A shower water recycling apparatus, comprising,
   a shower conduit, the shower conduit including a shower conduit valve, and a delivery conduit directed into fluid communication with the shower conduit valve, wherein the shower conduit valve permits selective fluid flow to the shower conduit and the delivery conduit,
   and
   a storage tank, with the storage tank having a storage tank floor and a stand pipe directed from the storage tank floor, with the storage tank having a stand pipe entrance end and the delivery conduit directed into the storage conduit and into the stand pipe entrance end,
   and a primary fluid conduit directed into the stand pipe through the storage tank floor,
and
first valve means mounted to the stand pipe between the entrance end and the storage tank floor for directing selective fluid flow from the primary fluid conduit through the stand pipe, and second valve means mounted to the stand pipe in fluid communication with the delivery conduit within the stand pipe for permitting selective fluid flow from the delivery conduit through the stand pipe.

2. An apparatus as set forth in claim 1 wherein the first valve means includes a first float, having a first float arm, and the first float arm pivotally mounted to the stand pipe, wherein the first float arm includes a valve plate mounted within the stand pipe to direct fluid flow from the primary fluid conduit into the stand pipe, with the stand pipe having a plurality of window openings positioned between the first float valve plate and the stand pipe entrance end, and the second valve means includes a second float, with the second float having a second float arm, and the second float arm including a second arm valve member mounted to the delivery conduit within the stand pipe between the window openings and the stand pipe entrance end.

3. An apparatus as set forth in claim 2 wherein the delivery conduit includes an additive dispenser housing, having a first chamber and a second chamber arranged for securement relative to one another, with a screen grid mounted within the second chamber, and a rotary plate mounted within the second chamber adjacent the screen plate, and the rotary plate having a rotary plate opening, and a handle mounted to the rotary plate adjacent the rotary plate opening, and a bactericide water soluble tablet arranged for positioning relative to and in adjacency to the screen grid, with the tablet having a plurality of dye capsules contained therewithin, having a water soluble dye to indicate fluid flow through the additive dispenser housing into the stand pipe.

* * * * *